US012123344B2

(12) United States Patent
Ajami et al.

(10) Patent No.: US 12,123,344 B2
(45) Date of Patent: Oct. 22, 2024

(54) ENGINE AND SECONDARY POWER UNIT INTEGRATED OPERATION

(71) Applicant: RTX Corporation, Farmington, CT (US)

(72) Inventors: Andre M. Ajami, Henderson, NV (US); Ryan W. Hunter, North Palm Beach, FL (US); Javier A. Cue, Palm Beach Gardens, FL (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/240,505

(22) Filed: Aug. 31, 2023

(65) Prior Publication Data

US 2023/0407783 A1    Dec. 21, 2023

Related U.S. Application Data

(62) Division of application No. 16/791,106, filed on Feb. 14, 2020, now Pat. No. 11,795,872.

(51) Int. Cl.
*F02C 6/00* (2006.01)
*F02C 3/04* (2006.01)
(Continued)

(52) U.S. Cl.
CPC ............. *F02C 3/04* (2013.01); *F02C 7/36* (2013.01); *F02C 6/18* (2013.01); *F05D 2220/323* (2013.01); *F05D 2220/50* (2013.01); *F05D 2220/76* (2013.01); *F05D 2240/35* (2013.01); *F05D 2270/304* (2013.01)

(58) Field of Classification Search
CPC ...... F02C 3/04; F02C 6/00; F02C 6/18; F02C 6/08; F02C 9/52; F05D 2220/50; F05D 2220/76
See application file for complete search history.

(56) References Cited

U.S. PATENT DOCUMENTS 5,813,630 A    9/1998  Williams
5,899,085 A    5/1999  Williams
(Continued)

OTHER PUBLICATIONS

EP Application No. 21157222.7 Extended EP Search Report dated Jul. 12, 2021, 7 pages.

*Primary Examiner* — Steven M Sutherland
(74) *Attorney, Agent, or Firm* — CANTOR COLBURN LLP

(57) ABSTRACT

An engine system includes a gas turbine engine with a first compressor, a first combustor, and first turbine. The engine system also includes a secondary power unit with a second compressor, a second combustor, a second turbine, a third compressor coupled to the second compressor, and an electric motor-generator, where the secondary power unit is coupled to the gas turbine engine and includes a heat exchanger. A controller is operable to determine an operating mode of the engine system, select an input energy source and an output type of the secondary power unit based on the operating mode, control the secondary power unit based on the input energy source and the output type as selected, detect a change in the operating mode of the engine system, and modify the input energy source and/or the output type of the secondary power unit based on the change in the operating mode.

20 Claims, 4 Drawing Sheets

(51) Int. Cl.
*F02C 7/36* (2006.01)
*F02C 6/18* (2006.01)

(56) References Cited

U.S. PATENT DOCUMENTS

| | | |
|---|---|---|
| 2003/0126864 A1 | 7/2003 | Thompson |
| 2004/0168427 A1* | 9/2004 | Truco ..................... F01D 13/02 60/791 |
| 2005/0097896 A1* | 5/2005 | Critchley ................. F02C 6/00 60/776 |
| 2008/0104938 A1 | 5/2008 | Finkenrath et al. |
| 2008/0245050 A1 | 10/2008 | Wollenweber |
| 2010/0170262 A1 | 7/2010 | Kaslusky et al. |
| 2015/0246733 A1 | 9/2015 | Silet et al. |
| 2016/0273399 A1* | 9/2016 | Ekanayake ............... F02C 3/04 |
| 2017/0106985 A1 | 4/2017 | Stieger et al. |
| 2018/0022465 A1 | 1/2018 | Gelwan et al. |
| 2019/0263528 A1 | 8/2019 | Casado-Montero et al. |
| 2021/0254545 A1 | 8/2021 | Ajami et al. |

\* cited by examiner

ENGINE AND SECONDARY POWER UNIT INTEGRATED OPERATION

CROSS-REFERENCE TO RELATED APPLICATIONS

This application is a division of U.S. application Ser. No. 16/791,106 filed Feb. 14, 2020, the disclosure of which is incorporated herein by reference in its entirety.

BACKGROUND

The subject matter disclosed herein generally relates to engine systems and, more particularly, to integrated operation of an engine and a secondary power unit.

A propulsion system for an aircraft can include one or more gas turbine engines that combust fuel and provide propulsive power. Aircraft can also include an auxiliary power unit that typically generates compressed air while the aircraft is on the ground to assist with starting one or more gas turbine engines. An auxiliary power unit can also include an electric generator that may be used to provide electrical power to the aircraft prior to starting the gas turbine engines. Other systems on an aircraft can include an environmental control system that uses one or more air cycle machines to produce cooled conditioned air for a passenger cabin of the aircraft. Air cycle machines and an auxiliary power unit are typically installed in physically separate regions of the aircraft. For example, an auxiliary power unit may be installed in the tail section of the aircraft, while the air cycle machines may be installed in the fuselage of the aircraft physically closer to the gas turbine engines. An auxiliary power unit typically combusts fuel during operation, while an air cycle machine typically does not directly combust fuel.

BRIEF DESCRIPTION

According to one embodiment, an engine system includes a gas turbine engine with a first compressor, a first combustor, and a first turbine. The engine system also includes a secondary power unit with a second compressor, a second combustor, a second turbine, a third compressor coupled to the second compressor, and an electric motor-generator, where the secondary power unit is coupled to the gas turbine engine. The secondary power unit further includes a heat exchanger configured to receive pressurized air from the first compressor. A controller is operable to determine an operating mode of the engine system, select an input energy source and an output type of the secondary power unit based on the operating mode, control the secondary power unit based on the input energy source and the output type as selected, detect a change in the operating mode of the engine system, and modify the input energy source and/or the output type of the secondary power unit based on the change in the operating mode.

In addition to one or more of the features described above or below, or as an alternative, further embodiments may include where the operating mode includes a source electric power mode with the electric motor-generator in a generator mode to provide electric power as the output type.

In addition to one or more of the features described above or below, or as an alternative, further embodiments may include where the input energy source of the secondary power unit includes fuel to the second combustor, waste heat from the first turbine to the second turbine, and/or pressurized air from the first compressor to the second turbine.

In addition to one or more of the features described above or below, or as an alternative, further embodiments may include where the second compressor is configured to receive air from an inlet and/or the first compressor.

In addition to one or more of the features described above or below, or as an alternative, further embodiments may include where the operating mode includes a compressed air output mode with the third compressor providing compressed air as the output type.

In addition to one or more of the features described above or below, or as an alternative, further embodiments may include where the input energy source of the secondary power unit includes fuel to the second combustor, waste heat from the first turbine to the second turbine, pressurized air from the first compressor to the second turbine, and/or electric power at the electric motor-generator in a motor mode.

In addition to one or more of the features described above or below, or as an alternative, further embodiments may include where the second compressor is configured to receive air from an inlet and/or the first compressor.

In addition to one or more of the features described above or below, or as an alternative, further embodiments may include where the second turbine is configured to output conditioned air as a cooling source.

In addition to one or more of the features described above or below, or as an alternative, further embodiments may include where the electric motor-generator is in a generator mode to provide electric power as the output type.

In addition to one or more of the features described above or below, or as an alternative, further embodiments may include where the third compressor is configured to provide compressed air as the output type.

According to an embodiment, a method includes determining an operating mode of an engine system including a gas turbine engine and a secondary power unit, where the gas turbine engine includes a first compressor, a first combustor, and a first turbine. The secondary power unit includes a second compressor, a second combustor, a second turbine, a third compressor coupled to the second compressor, and an electric motor-generator, where the secondary power unit is coupled to the gas turbine engine. The secondary power unit further includes a heat exchanger configured to receive pressurized air from the first compressor. An input energy source and an output type of the secondary power unit are selected based on the operating mode. The secondary power unit is controlled based on the input energy source and the output type as selected. A change in the operating mode of the engine system can be detected. The input energy source and/or the output type of the secondary power unit can be modified based on the change in the operating mode.

A technical effect of the apparatus, systems and methods is achieved by providing an engine system with a secondary power unit.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
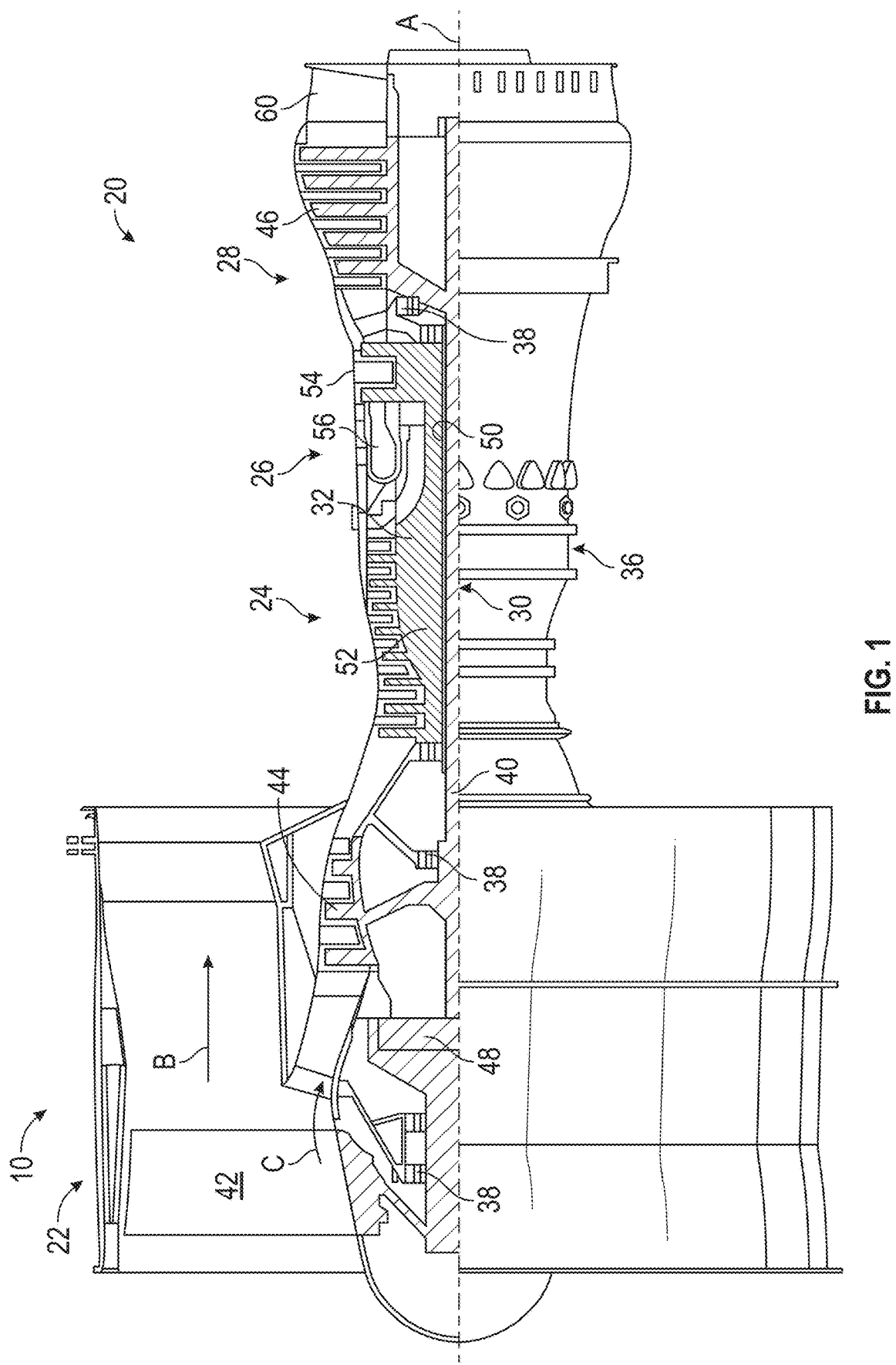
FIG. 1 is a partial cross-sectional illustration of a gas turbine engine, in accordance with an embodiment of the disclosure.

FIG. 1 schematically illustrates a gas turbine engine 20 as part of a propulsion system 10 that can include multiple instances of the gas turbine engine 20 and other components (not depicted). The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle 60. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption (TSFCT)"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^0.5$. The "Low corrected fan tip speed" as disclosed herein according to one non-limiting embodiment is less than about 1150 ft/second (350.5 m/sec).

While the example of FIG. 1 illustrates one example of the gas turbine engine 20, it will be understood that any number of spools, inclusion or omission of the gear system 48, and/or other elements and subsystems are contemplated. Further, systems described herein can be used in a variety of applications and need not be limited to gas turbine engines for aircraft applications. For example, systems described herein can be included in power generation systems, which may be ground-based as a fixed position or mobile system, and other such applications.

Figure 2:
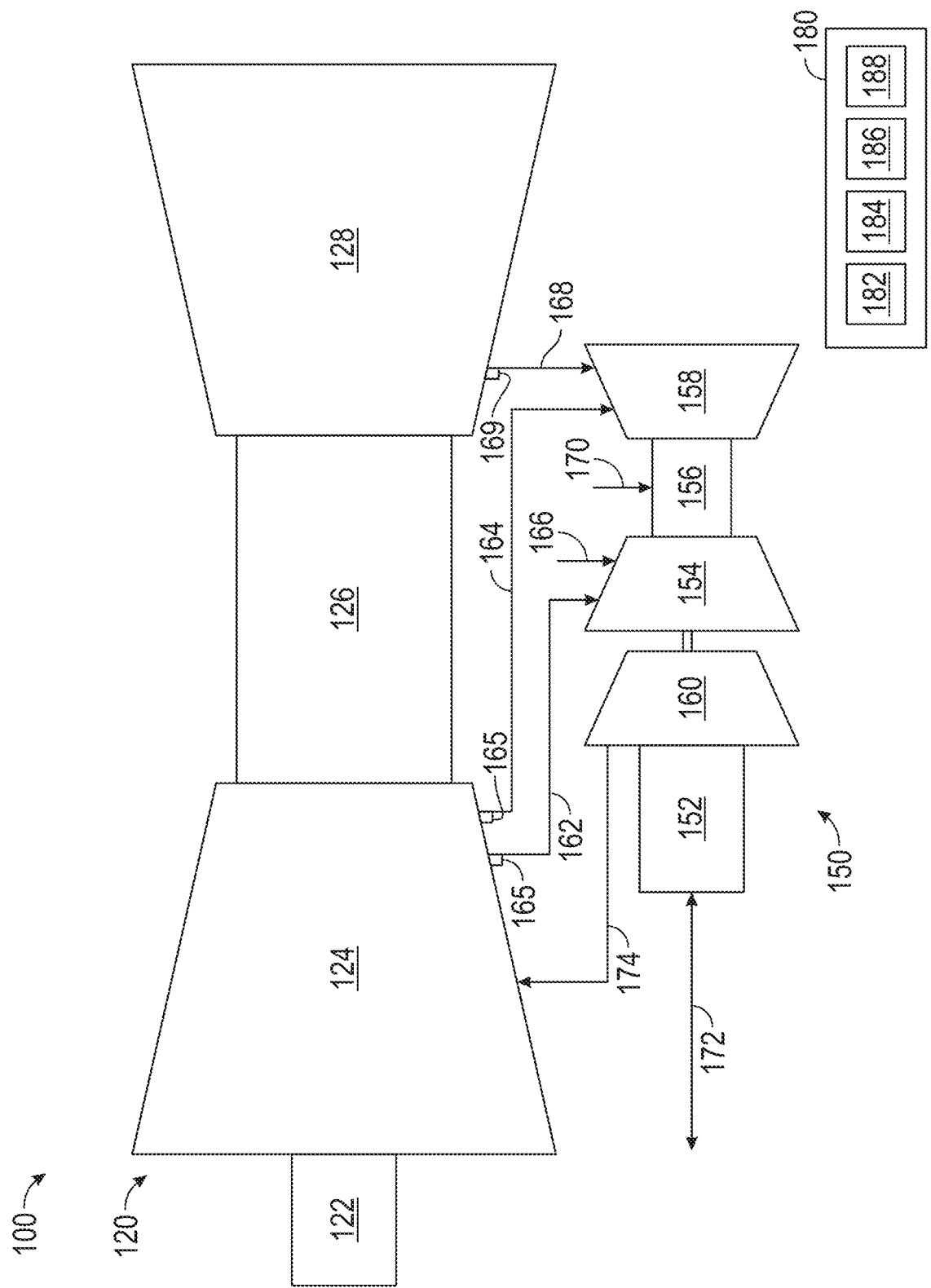
FIG. 2 is a schematic diagram of an engine system with a secondary power unit, in accordance with an embodiment of the disclosure.

FIG. 2 illustrates an example of an engine system 100 that can be part of the propulsion system 10 of FIG. 1. The engine system 100 includes a gas turbine engine 120 and a secondary power unit 150. The gas turbine engine 120 is a simplified example of the gas turbine engine 20 of FIG. 1 and can include additional components beyond those depicted in the FIG. 2. In the example of FIG. 2, the gas turbine engine 120 includes a first compressor 124, a first combustor 126, and a first turbine 128. Similar to the compressor section 24 and the turbine section 28 of FIG. 1, the first compressor 124 and the first turbine 128 can include multiple stages configured to operate at lower or higher pressures and can be linked through multiple spools configured to rotate at different speeds. The gas turbine engine 120 can also include an engine electric motor-generator 122 that can be operated in a motor mode or a generator mode. For example, when the gas turbine engine 120 has been started, the engine electric motor-generator 122 may operate in a generator mode to provide electric power to one or more aircraft systems. The engine electric motor-generator 122 may operate in a motor mode, for example, to assist in starting the gas turbine engine 120 or to perform other operations, such as rotating components of the gas turbine engine 120 to assist in homogenizing temperatures after shutdown to avoid bowed rotor effects. Although depicted as a single component, the engine electric motor-generator 122 may be subdivided in some embodiments into one or more electric motors and one or more generators. Further, the engine electric motor-generator 122 may be coupled with the first compressor 124 through a gearbox, clutch, and/or other components (not depicted).

The secondary power unit 150 can include a second compressor 154, a second combustor 156, a second turbine 158, a third compressor 160 coupled to the second compressor 154, and an electric motor-generator 152. The secondary power unit 150 can perform functions of a known auxiliary power unit and a known air cycle machine, such as providing starting support to the gas turbine engine 120 and providing cabin cooling air to an aircraft upon which the secondary power unit 150 is installed. Additionally, the secondary power unit 150 enables functionality that is not directly supported by known auxiliary power units and air cycle machines through multiple operating modes. The secondary power unit 150 can be coupled to the gas turbine engine 120 through multiple interfaces that are selectable depending upon the current conditions and operating mode based on gas turbine, engine system and/or aircraft operational parameters. For example, the second compressor 154 of the secondary power unit 150 can be pneumatically coupled (e.g., using ducting) with the first compressor 124 of the gas turbine engine 120 such that the second compressor 154 can receive pressurized air 162 from the first compressor 124. Further, pressurized air 164 from the first compressor 124 can be provided to the second turbine 158. One or more engine bleed taps of the first compressor 124 can be selected to provide one or more sources of pressurized air 162, 164. In some embodiments, a same bleed tap of the first compressor 124 may provide pressurized air 162, 164 to either or both of the second compressor 154 and the second turbine 158. For instance, one or more valves 165 may be controlled by a controller 180 to select an input energy source from the gas turbine engine 120, such as pressurized air 164.

In some modes of operation, the second compressor 154 can receive air from an inlet 166 rather than pressurized air 162 from the first compressor 124. The inlet 166 may access air from an outside environment, for instance, bypass air. Similarly, rather than receiving pressurized air 164 from the first compressor 124 or heated air from the second combustor 156, the second turbine 158 can receive waste heat 168 from the first turbine 128 as an input energy source. The waste heat 168 can be transferred directly as heated air extracted from the first turbine 128 or through a heat exchange system (not depicted), for instance, using a working fluid to transfer the waste heat 168 from the first turbine 128 to the second turbine 158. Valves 169 or other control elements can be used to control the transfer of waste heat 168, for example, using one of more control signals commanded by the controller 180. As another input energy source, the second combustor 156 can receive fuel 170 to combust to increase the temperature of gasses provided to the second turbine 158.

In the example of FIG. 2, the secondary power unit 150 can provide one or more output types. For example, the electric motor-generator 152 can be configured in a generator mode to provide electric power 172 as the output type. The electric power 172 output by the electric motor-generator 152 can be used for various purposes on an aircraft that includes the engine system 100. For example, the electric power 172 can be provided to the engine electric motor-generator 122 for electrical assist power during normal operation or during startup of the gas turbine engine 120. Although depicted as a single component, the electric motor-generator 152 may be subdivided in some embodiments into one or more electric motors and one or more generators. Further, the electric motor-generator 152 may be coupled with the second compressor 154 and/or with the third compressor 160 through a gearbox, clutch, and/or other components (not depicted). In motor mode, the electric motor-generator 152 can receive electric power 172 as an input energy source. For example, the motor mode can be used to start rotation of the second compressor 154, third compressor 160, and second turbine 158 prior to combustion of fuel 170 within the second combustor 156.

The third compressor 160 may be a load or scroll compressor, for example, that produces compressed air 174 as the output type. The compressed air 174 may be used to assist in operation or starting of the gas turbine engine 120 or may have other aircraft uses. As one example, the compressed air 174 may be used to assist in conditioning cabin air, provide anti-icing, or other such applications.

In embodiments, the controller 180 can control and monitor for fault conditions of the gas turbine engine 120 and/or the secondary power unit 150. For example, the controller 180 can be integrally formed or otherwise in communication with a full authority digital engine control (FADEC) of the gas turbine engine 120. In embodiments, the controller 180 can include a processing system 182, a memory system 184, and an input/output interface 186. The controller 180 can also include various operational controls, such as a secondary power unit control 188 that identifies an operating mode and controls the selection of input energy source, output type, and/or other control parameters as further described herein. Integrating control aspects of the gas turbine engine 120 with control aspects of the secondary power unit 150 in controller 180 can enable shared enhancements that may not have been previously achievable in separately controlled subsystems. For example, effects of shifting system loads in relation to system health and aircraft operating mode may enable the gas turbine engine 120 and/or the secondary power unit 150 to operate closer to peak efficiency, peak power and/or more efficient usage of the bleed, fuel and air inputs when controlled collectively. Further, integration of operational control of the gas turbine engine 120 and secondary power unit 150 can enable combined power and thermal management system operation with greater efficiency and performance characteristics than may be realized in operating the gas turbine engine 120, secondary power unit 150, and associated subsystems separately.

The processing system 182 can include any type or combination of central processing unit (CPU), including one or more of: a microprocessor, a digital signal processor (DSP), a microcontroller, an application specific integrated circuit (ASIC), a field programmable gate array (FPGA), or the like. The memory system 184 can store data and instructions that are executed by the processing system 182. In embodiments, the memory system 184 may include random access memory (RAM), read only memory (ROM), or other electronic, optical, magnetic, or any other computer readable medium onto which is stored data and algorithms in a non-transitory form. The input/output interface 186 is configured to collect sensor data from the one or more system sensors and interface with various components and subsystems of the engine system 100. The controller 180 provides a means for controlling aspects of the engine system 100. The means for controlling the engine system 100 can be otherwise subdivided, distributed, or combined with other control elements (not depicted).

As one example, the controller 180 can apply control laws and access/update models to determine how to control and transfer power between the gas turbine engine 120, secondary power unit 150, and/or other aircraft components. For example, sensed and/or derived parameters related to speed, flow rate, pressure ratios, temperature, thrust, and the like can be used to establish operational schedules and transition limits to maintain efficient operation of the gas turbine engine 120 in combination with the secondary power unit 150. For instance, a mode of operation of the gas turbine engine 120, such as idle, takeoff, climb, cruise, and descent can have different power settings, thrust requirements, flow requirements, and temperature effects. The secondary power unit control 188 can control one or more effectors that select an input energy source of the secondary power unit 150 and/or an output type of the secondary power unit 150. The secondary power unit control 188 can determine when a change in operating mode of the engine system 100 should result in a modified selection of the input energy source of the secondary power unit 150 and/or the output type of the secondary power unit 150.

For example, during a ground start operating mode of the secondary power unit 150, the input energy source can be fuel 170 and/or electric power 172, and the second compressor 154 can receive air at inlet 166 as part of a cold-start sequence. During an engine-assisted start operating mode of the secondary power unit 150, the input energy source can be fuel 170 and/or electric power 172, and the second compressor 154 can receive pressurized air 162 to ramp up speed of the second compressor 154 and second turbine 158 faster than may be achieved using air from inlet 166. To assist with starting of the gas turbine engine 120 using the secondary power unit 150, the electric motor-generator 152 can be set to generator mode to provide electric power 172 to the engine electric motor-generator 122, or the compressed air 174 output of the third compressor 160 can be used to drive rotation of the first compressor 124. In operating modes that output electric power 172, various configurations can be supported, for example, the input energy source of the secondary power unit 150 can be fuel 170 with air extracted from the inlet 166 to avoid extracting air from the gas turbine engine 120. Further, the input energy source of the secondary power unit 150 can be waste heat 168 and/or pressurized air 164. In some modes of operation, fuel 170 may not flow to the second combustor 156, for instance, where the second turbine 158 receives waste heat 168 and/or pressurized air 164. When the output type is compressed air 174, the input energy source of the secondary power unit 150 can be fuel 170 with air extracted from the inlet 166 to avoid extracting air from the gas turbine engine 120. Further, compressed air 174 can be generated using electric power 172 as an input in motor mode of the electric motor-generator 152, with pressurized air 162, 164, and/or waste heat 168. Using waste heat 168 as an input energy source can enhance power and thermal management collectively for the engine system 100.

Figure 3:
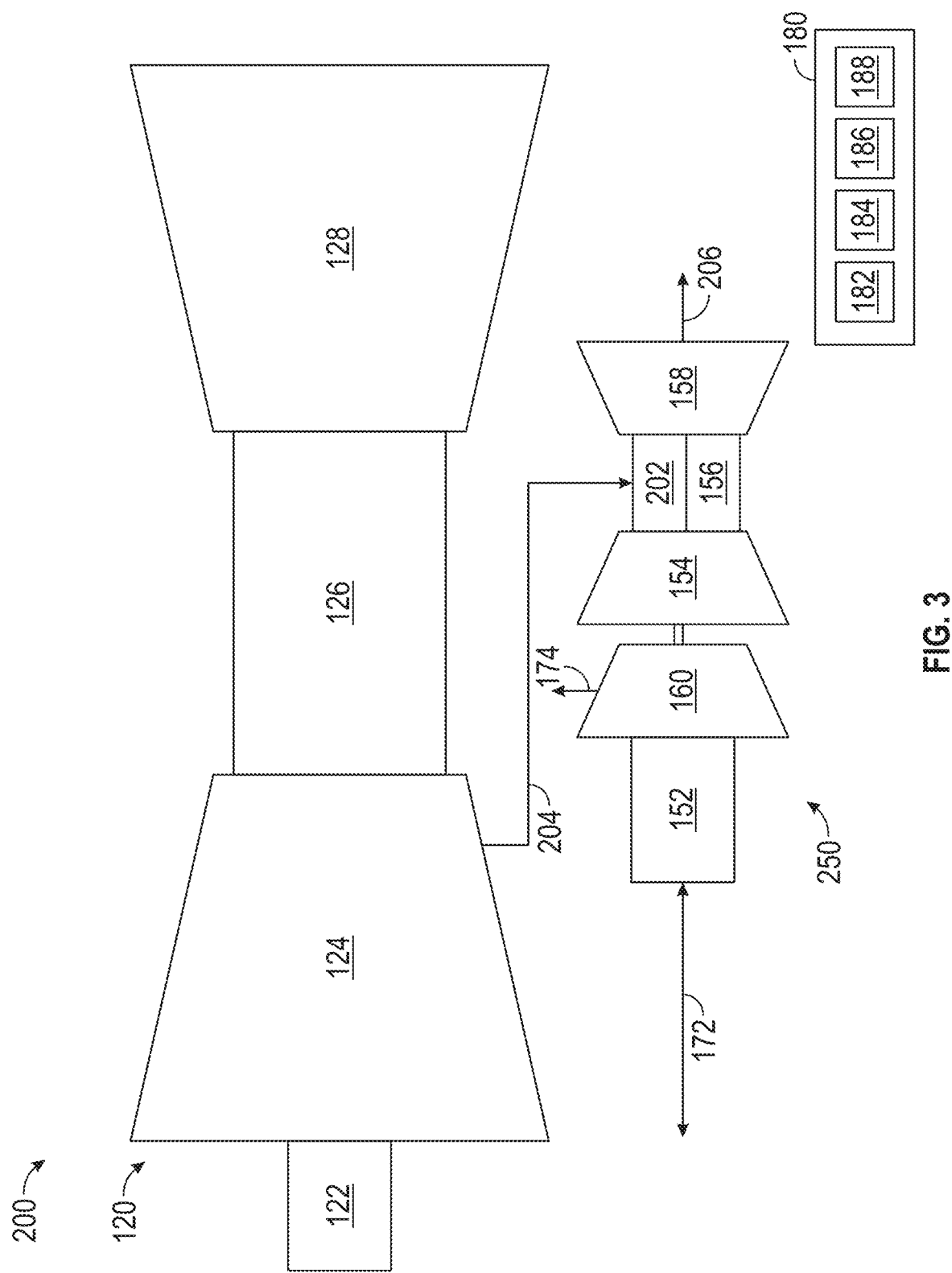
FIG. 3 is a schematic diagram of an engine system with a secondary power unit, in accordance with an embodiment of the disclosure.

FIG. 3 illustrates an example of an engine system 200 that can be part of the propulsion system 10 of FIG. 1. The engine system 200 includes the gas turbine engine 120 of FIG. 2 and a secondary power unit 250. Similar to the secondary power unit 150 of FIG. 2, the secondary power unit 250 of FIG. 3 includes second compressor 154, second combustor 156, second turbine 158, third compressor 160 coupled to the second compressor 154, and electric motor-generator 152. The secondary power unit 250 also includes a heat exchanger 202. The heat exchanger 202 can receive pressurized air 204 from the first compressor 124 of the gas turbine engine 120 for energy extraction as an input energy source of the secondary power unit 150. The second turbine 158 of the secondary power unit 250 can output conditioned air 206 as a cooling source. The cooling source can be for an aircraft cabin, a cargo area, galley cooling, electronics system cooling, and/or other such uses. Other outputs types of the secondary power unit 250 can include electric power 172 output by the electric motor-generator 152 in generator mode and/or compressed air 174 output by the third compressor 160. Similar to the example of FIG. 2, controller 180 can control operation of the engine system 200, including the secondary power unit 250 and components used for input power selection and output type selection.

Figure 4:
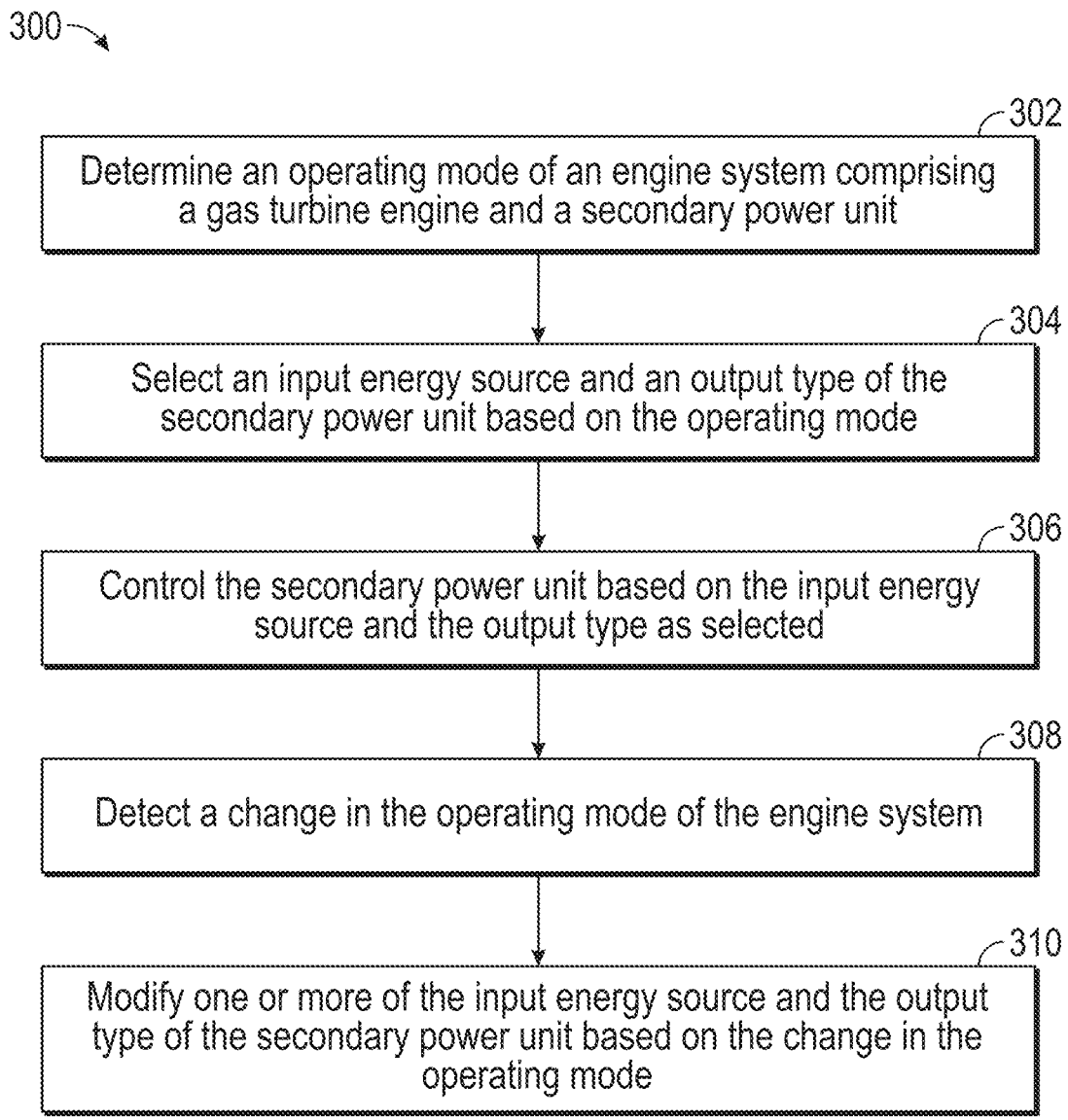
FIG. 4 is a flow chart illustrating a method, in accordance with an embodiment of the disclosure.

Referring now to FIG. 4 with continued reference to FIGS. 1-3, FIG. 4 is a flow chart illustrating a method 400 for controlling an engine system 100, 200 including a gas turbine engine 120 and a secondary power unit 150, 250, in accordance with an embodiment. The method 400 may be performed, for example, by using engine system 100, 200 of FIGS. 2-3 and/or other such systems (not depicted).

At block 302, an operating mode of an engine system 100 including a gas turbine engine 120 and a secondary power unit 150, 250 can be determined, for instance, by a controller 180. At block 304, an input energy source and an output type of the secondary power unit 150, 250 are selected based on the operating mode. Events such as an engine start request, a restart request, an electric power demand, a compressed air demand, a conditioned air demand, and other such events can be used to establish an operating mode. For instance, if sufficient operating margin exists with respect to the gas turbine engine 120, the controller 180 may select an input energy source for the secondary power unit 150, 250 as pressurized air 162, 164, 204. Alternatively, if the waste heat 168 is sufficiently high (e.g., based on a temperature threshold), then the input energy source may be waste heat 168. In some instances, a blend of input energy sources, such as fuel 170, electric power 172, and waste heat 168 may be combined. Further, selections can be based on gas turbine, engine system and/or aircraft operational parameters.

At block 306, the secondary power unit 150, 250 can be controlled based on the input energy source and the output type as selected. For instance, the controller 180 can apply different control laws depending on the input energy source and the output type.

At block 308, a change in the operating mode of the engine system 100, 200 can be detected. For example, if a restart of the gas turbine engine 120 or secondary power unit 150, 250 is needed, a change in operating mode can result. Further, if a new demand is detected or a previous demand diminishes, a change in operating mode can result. Changes in power settings, such as idle, takeoff, climb, cruise, and descent, can result in operating mode changes with respect to the engine system 100, 200. Further, failure modes, such as a power loss elsewhere in the propulsion system 10 can result in an operating mode change.

At block 310, the input energy source and/or the output type of the secondary power unit 150, 250 can be modified based on the change in the operating mode. For instance, the secondary power unit 150, 250 may toggle the electric motor-generator 152 between motor mode and generator mode. If the operating margin of the gas turbine engine 120 is within a predetermined threshold, for example, the secondary power unit 150, 250, may switch from extracting pressurized air 162, 164, 204 to using fuel 170 as an input energy source. The operating mode can be further classified as a source electric power mode with the electric motor-generator 152 in a generator mode to provide electric power 172 as the output type. As another example, the operating mode can be a compressed air output mode with the third compressor 160 providing compressed air 174 as the output type.

In the source electric power mode, the input energy source of the secondary power unit 150 can be fuel 170 provided to the second combustor 156, waste heat 168 from the first turbine 128 to the second turbine 158, and/or pressurized air 164 from the first compressor 124 to the second turbine 158. The second compressor 154 can be configured to receive air from an inlet 166 and/or the first compressor 124 as pressurized air 162.

In compressed air output mode, the input energy source of the secondary power unit 150 can be fuel 170 provided to the second combustor 156, waste heat 168 from the first turbine 128 to the second turbine 158, pressurized air 164 from the first compressor 124 to the second turbine 158, and/or electric power 172 at the electric motor-generator 152 in a motor mode. The second compressor 154 can be configured to receive air from an inlet 166 and/or the first compressor 124 as pressurized air 162.

Where the secondary power unit 250 includes a heat exchanger 202 configured to receive pressurized air 204 from the first compressor 124 as the input energy source, the second turbine 158 can be configured to output conditioned air 206 as a cooling source. The electric motor-generator 152 can be in a generator mode to provide electric power 172 as the output type and/or the third compressor 160 can be configured to provide compressed air 174 as the output type in combination with outputting of the conditioned air 206.

While the above description has described the flow process of FIG. 4 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An engine system comprising:
   a gas turbine engine comprising a first compressor, a first combustor, and a first turbine;
   a secondary power unit comprising a second compressor, a second combustor, a second turbine, a third compressor coupled to the second compressor, and an electric motor-generator, wherein the secondary power unit is coupled to the gas turbine engine, and wherein the secondary power unit further comprises a heat exchanger configured to receive pressurized air from the first compressor; and
   a controller operable to:
      determine an operating mode of the engine system;
      select an input energy source and an output type of the secondary power unit based on the operating mode,
      control the secondary power unit based on the input energy source and the output type as selected;
      detect a change in the operating mode of the engine system; and
      modify the input energy source and/or the output type of the secondary power unit based on the change in the operating mode.

2. The engine system of claim 1, wherein the operating mode comprises a source electric power mode with the electric motor-generator in a generator mode to provide electric power as the output type.

3. The engine system of claim 1, wherein the input energy source of the secondary power unit comprises fuel to the second combustor, and wherein the controller is configured to switch the input energy source from the pressurized air to fuel based on the operating margin of the gas turbine engine being within a predetermined threshold.

4. The engine system of claim 1, wherein the operating mode is selectable between a ground start operating mode, an engine-assisted start operating mode, a source electric power mode, and a compressed air output mode.

5. The engine system of claim 4, wherein the operating mode is established based on one or more events comprising: an engine start request, a restart request, an electric power demand, a compressed air demand, and a conditioned air demand.

6. The engine system of claim 5, wherein the input energy source of the secondary power unit comprises fuel to the second combustor and/or electric power at the electric motor-generator in a motor mode.

7. The engine system of claim 1, wherein the controller is operable to select the input energy source and the output type of the secondary power unit based on a current condition of the engine system.

8. The engine system of claim 1, wherein the second turbine is configured to output conditioned air as a cooling source.

9. The engine system of claim 8, wherein the electric motor-generator is configured in a generator mode to provide electric power as the output type.

10. The engine system of claim 8, wherein the third compressor is configured to provide compressed air as the output type.

11. A method comprising:
   determining an operating mode of an engine system comprising a gas turbine engine and a secondary power unit, wherein the gas turbine engine comprises a first compressor, a first combustor, and a first turbine, and the secondary power unit comprises a second compressor, a second combustor, a second turbine, a third compressor coupled to the second compressor, and an electric motor-generator, wherein the secondary power unit is coupled to the gas turbine engine, and wherein the secondary power unit further comprises a heat exchanger configured to receive pressurized air from the first compressor;
   selecting an input energy source and an output type of the secondary power unit based on the operating mode;
   controlling the secondary power unit based on the input energy source and the output type as selected;
   detecting a change in the operating mode of the engine system; and
   modifying the input energy source and/or the output type of the secondary power unit based on the change in the operating mode.

12. The method of claim 11, wherein the operating mode comprises a source electric power mode with the electric motor-generator in a generator mode to provide electric power as the output type.

13. The method of claim 11, wherein the input energy source of the secondary power unit comprises fuel to the second combustor, and further comprising switching the input energy source from the pressurized air to fuel based on an operating margin of the gas turbine engine being within a predetermined threshold.

14. The method of claim 11, wherein the operating mode is selectable between a ground start operating mode, an engine-assisted start operating mode, a source electric power mode, and a compressed air output mode.

15. The method of claim 14, wherein the operating mode is established based on one or more events comprising: an engine start request, a restart request, an electric power demand, a compressed air demand, and a conditioned air demand.

16. The method of claim 15, wherein the input energy source of the secondary power unit comprises fuel to the second combustor and/or electric power at the electric motor-generator in a motor mode.

17. The method of claim 11, further comprising selecting the input energy source and the output type of the secondary power unit based on a current condition of the engine system.

18. The method of claim 11, wherein the second turbine is configured to output conditioned air as a cooling source.

19. The method of claim 18, wherein the electric motor-generator is configured in a generator mode to provide electric power as the output type.

20. The method of claim 18, wherein the third compressor is configured to provide compressed air as the output type.

* * * * *